United States Patent
Inui et al.

(10) Patent No.: US 6,462,502 B1
(45) Date of Patent: Oct. 8, 2002

(54) STEPPER MOTOR CONTROLLING APPARATUS

(75) Inventors: Takashi Inui; Yoshinori Wada, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/413,244

(22) Filed: Oct. 7, 1999

(30) Foreign Application Priority Data

Jan. 27, 1999 (JP) .......................................... 11-018937

(51) Int. Cl.⁷ ................................................ H02P 8/00
(52) U.S. Cl. ........................ 318/696; 318/696; 318/685; 318/625
(58) Field of Search ................................ 318/626, 685, 318/625

(56) References Cited

U.S. PATENT DOCUMENTS

| | | | | |
|---|---|---|---|---|
| 3,497,778 A | * | 2/1970 | Gerber | 318/8 |
| 4,468,741 A | * | 8/1984 | Simonton | 364/474 |
| 4,689,541 A | * | 8/1987 | Jones et al. | 318/696 |
| 4,847,779 A | * | 7/1989 | Masao et al. | 318/625 |
| 5,013,989 A | * | 5/1991 | Kurakake et al. | 318/625 |
| 5,343,133 A | * | 8/1994 | Malin et al. | 318/696 |
| 5,583,440 A | * | 12/1996 | Jacobson et al. | 318/696 |
| 5,642,024 A | * | 6/1997 | Okada et al. | 318/625 |

FOREIGN PATENT DOCUMENTS

| | | |
|---|---|---|
| DE | 39 28 451 A1 | 3/1991 |
| DE | 43 10 557 A1 | 10/1994 |
| DE | 44 17 369 A1 | 6/1995 |
| DE | 44 46 492 C2 | 1/1997 |
| EP | 256 769 A1 | 3/1988 |
| EP | 296 21 724 U1 | 3/1988 |
| JP | 56-10098 | 2/1981 |
| JP | 56-115199 | 9/1981 |
| JP | 58-43200 | 3/1983 |
| JP | 61-189199 | 8/1986 |
| JP | 61-141998 | 9/1986 |
| JP | 62-016096 | 1/1987 |
| JP | 3-118796 | 5/1991 |
| JP | 8-289529 | 11/1996 |
| JP | 9-285190 | 10/1997 |

OTHER PUBLICATIONS

Office Action of corresponding German application, 174PAT17–DE, dated Oct. 19, 2001.

\* cited by examiner

*Primary Examiner*—Robert E. Nappi
*Assistant Examiner*—Rina I. Duda
(74) *Attorney, Agent, or Firm*—Armstrong, Westerman & Hattori, LLP (57) ABSTRACT

A stepper motor controlling apparatus having a storing unit storing driving data for generating a stepper motor driving phase signal in each of plural controlling circuits, which share the driving data in the storing unit, thereby decreasing the total amount of the driving data. It is therefore possible to minimize the required capacity of the storing unit required for the driving data.

12 Claims, 5 Drawing Sheets

STEPPER MOTOR CONTROLLING APPARATUS

BACKGROUND OF THE INVENTION

Field of the Invention

The present invention relates to an apparatus used to control operations of a plurality of stepper motors in an apparatus such as a printing apparatus using a plurality of the stepper motors. Generally, a stepper motor is widely used for a speed control, a positioning control or the like on a printing paper conveying system, an operating unit or the like as a controlling actuator in a printing apparatus, for example, since the stepper motor is controllable by a digital signal, capable of controlling a speed in a wide range, capable of a highly accurate positioning, and capable of freely changing the rotating direction, etc. The stepper motor is rotated by switching a phase according to a pulse signal (stepper motor driving phase signal). By changing the stepper motor driving phase signal, it is possible to obtain a desired rotation speed.

In a stepper motor controlling apparatus, driving data (hereinafter referred to as sluing data) for creating the above stepper motor driving phase signal is beforehand prepared for each stepper motor.

When it is desired to rotate the stepper motor at a specific rotation speed, for example, sluing data for acceleration or deceleration until the stepper motor reaches a target rotation speed is required. In order to rotate the stepper motor at a constant speed after the stepper motor reaches the target rotation speed, sluing data for a constant speed is required. These sluing data are prepared for each stepper motor.

In, for example, a printing apparatus or the like, various sluing data is beforehand prepared for each stepper motor, the sluing data is stored in a storage medium such as a ROM or the like, required sluing data among these sluing data stored in the storage medium is read out according a program beforehand prepared under a control of a CPU (Central Processing Unit) or the like, and the stepper motor is driven by driving data created from the sluing data.

In the above stepper motor controlling apparatus, all sluing data is prepared for each stepper motor. In an apparatus including a plurality of stepper motors, for example, it is necessary to provide a region for storing sluing data for all the stepper motors in a storage medium such as a memory or the like. For this, the region in which sluing data is stored is increased with increasing the number of used stepper motors, hence a required capacity of the storage medium is increased.

Since a stepper motor is generally at a lower cost than a DC motor, there is an economical demand to use a stepper motor in a position where a motor is used as far as possible in designing an apparatus, so that the number of used stepper motors is inevitably increased, which leads to an increase of a capacity of the storage medium required to store the sluing data.

SUMMARY OF THE INVENTION

An object of the present invention is to provide a stepper motor controlling apparatus in which a capacity of a storing unit required for driving data is decreased by decreasing a quantity of the driving data.

The present invention therefore provides a stepper motor controlling apparatus having a plurality of controlling circuits controlling operations of a plurality of stepper motors, respectively, comprising a storing unit for storing driving data for generating a stepper motor driving phase signal in each of the controlling circuits, wherein the plural controlling circuits share the driving data in the storing unit.

According to the stepper motor controlling apparatus of this invention, driving data for creating a stepper motor driving phase signal in each of the controlling circuits is stored in the storing unit, and the plural controlling circuits share the driving data in the storing unit, so that it is unnecessary to store duplicate driving data in the storing unit. In consequence, this leads to a saving of a capacity of the storing unit, and it is economical.

Figure 1:
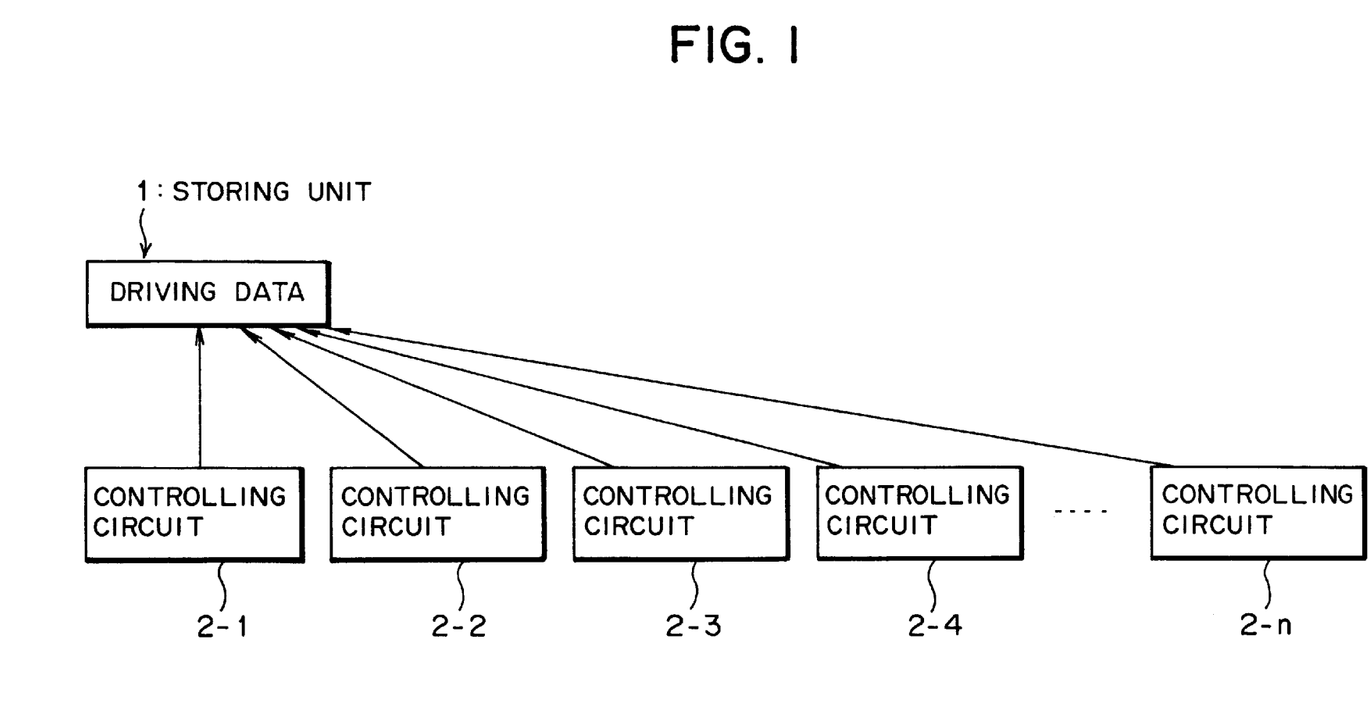
FIG. 1 is a block diagram showing an aspect of this invention.

DESCRIPTION OF THE PREFERRED EMBODIMENTS (a) Description of an Aspect of the Invention FIG. 1 is a block diagram showing an aspect of this invention. As shown in FIG. 1, a stepper motor controlling apparatus of this invention comprises a plurality of controlling circuits 2-1 through 2-n controlling operations of a plurality of stepper motors, respectively, and a storing unit 1 for storing driving data for generating a stepper motor driving phase signal in each of the controlling circuits 2-1 through 2-n, wherein the plural controlling circuits 2-1 through 2-n share the driving data in the storing unit 1.

According to the stepper motor controlling apparatus of this invention, driving data for creating a stepper motor driving phase signal in each of the controlling circuits 2-1 through 2-n is stored in the storing unit 1, and the plural controlling circuits 2-1 through 2-n share the driving data in the storing unit 1. In consequence, it is unnecessary to store duplicate driving data in the storing data, so that a capacity of the storing unit 1 is saved, which is economical.

Figure 2:
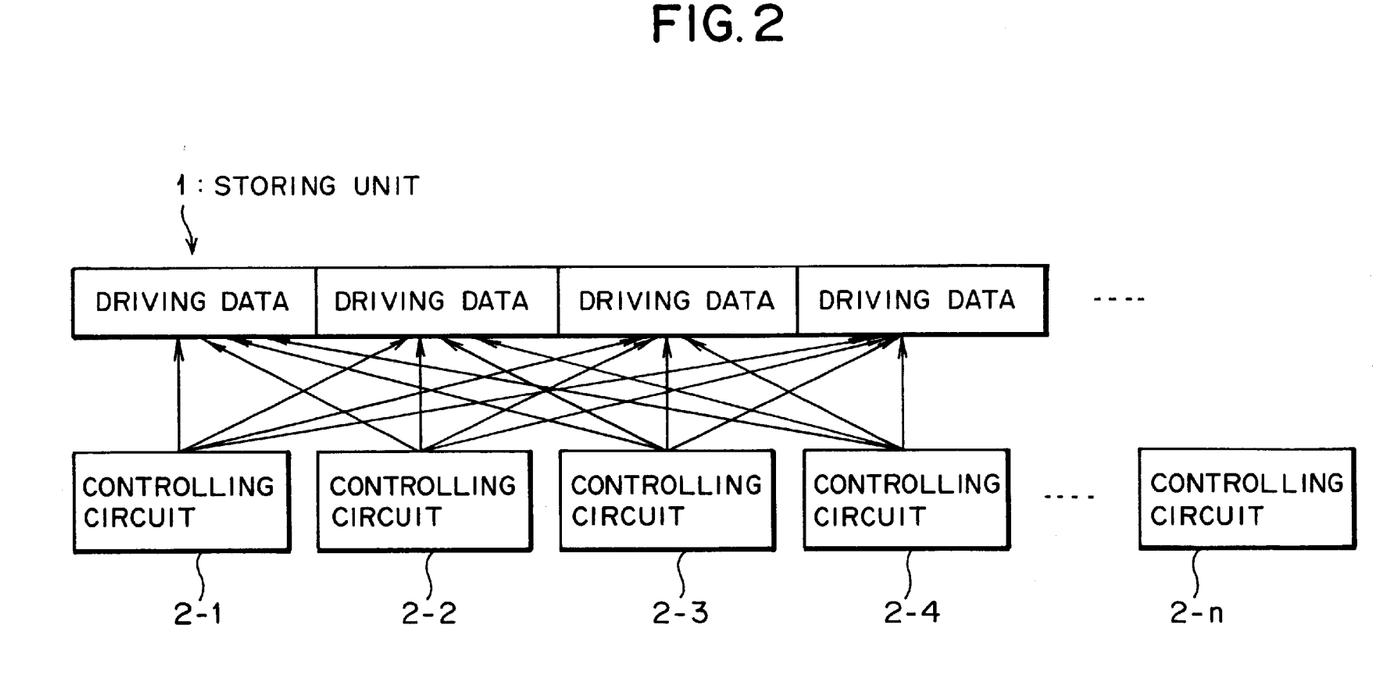
FIG. 2 is a block diagram showing another aspect of this invention.

FIG. 2 is a block diagram showing another aspect of this invention. As shown in FIG. 2, the storing unit 1 stores a plurality of items of driving data, and each of the controlling circuits 2-1 through 2-n selectively reads one item of the driving data among the plural items of driving data from the storing unit 1.

It is thereby possible to readily control the stepper motors.

The driving data may be stored in a region designated by a predetermined address in the storing unit 1, and each of the control circuits 2-1 through 2-n may selectively read the driving data from the storing unit 1 by designating the predetermined address. It is thereby possible to readily change a rotation speed of the stepper motor.

The driving data in the storing unit 1 may be added thereto operation information representing an operating state of the stepper motor driven by the driving data.

It is thereby possible to readily recognize an operating state of the stepper motor, and easily perform a control on an operation of the stepper motor.

Each of the controlling circuits 2-1 through 2-n may output an interrupt signal when detecting a change of the operating state of the stepper motor on the basis of the operation information added to the driving data during reading the driving data. It is therefore possible to use the interrupt signal as a trigger for setting the next operation of the stepper motor, for example, thereby smoothly changing a speed or the like of the stepper motor when changing the speed of the stepper motor using a plurality of driving data.

Each of the controlling circuits 2-1 through 2-n may read driving data according to the instruct signal from the storing unit 1 when inputted the instruct signal instructing an operating state of the stepper motor from the outside, and control an operation of the stepper motor using the read driving data.

It is thereby possible to readily control the operation of the stepper motor, and smoothly change a speed of the stepper motor.

Meanwhile, the instruct signal may be a detect signal from a sensor detecting state information relating to an operation of the stepper motor, or an output signal from a timer measuring a time relating to an operation of the stepper motor.

The detect signal or the output signal may be used as a trigger for a start/stop timing of the stepper motor, whereby an accuracy of a control on an operation of the stepper motor is improved, hence reliability of the apparatus is improved.

Each of the controlling circuits 2-1 through 2-n may read driving data according to the instruct signal from storing unit 1 upon lapse of a predetermined time after the instruct signal has been inputted.

It is thereby possible to instruct an operating state of the stepper motor without using a timer, a sensor or the like, hence a highly accurate control on the stepper motor is directly possible even at a position without a signal that will become a trigger, which is economical.

Further, each of the controlling circuits 2-1 through 2-n may detect the number of rotation steps of the stepper motor after started, read predetermined driving data from the storing unit 1 when the detected number of rotation steps coincides with a preset designated value, and control an operation of the stepper motor using the predetermined driving data read out.

It is thereby possible to instruct an operation sate of the stepper motor without using a timer, a sensor or the like, which is economical.

Incidentally, each of the controlling circuits 2-1 through 2-n may detect the number of rotation steps of the stepper motor after started, and notify of the detected number of rotation steps an upper apparatus.

It is thereby possible to use the number of rotation steps of the stepper motor in various uses, for example, to detect an operating state of the stepper motor, compensate the number of rotation steps, etc., which improves reliability of the apparatus.

(b) Description of an Embodiment of the Invention

Hereinafter, description will be made of an embodiment of this invention with reference to the drawings.

Figure 3:
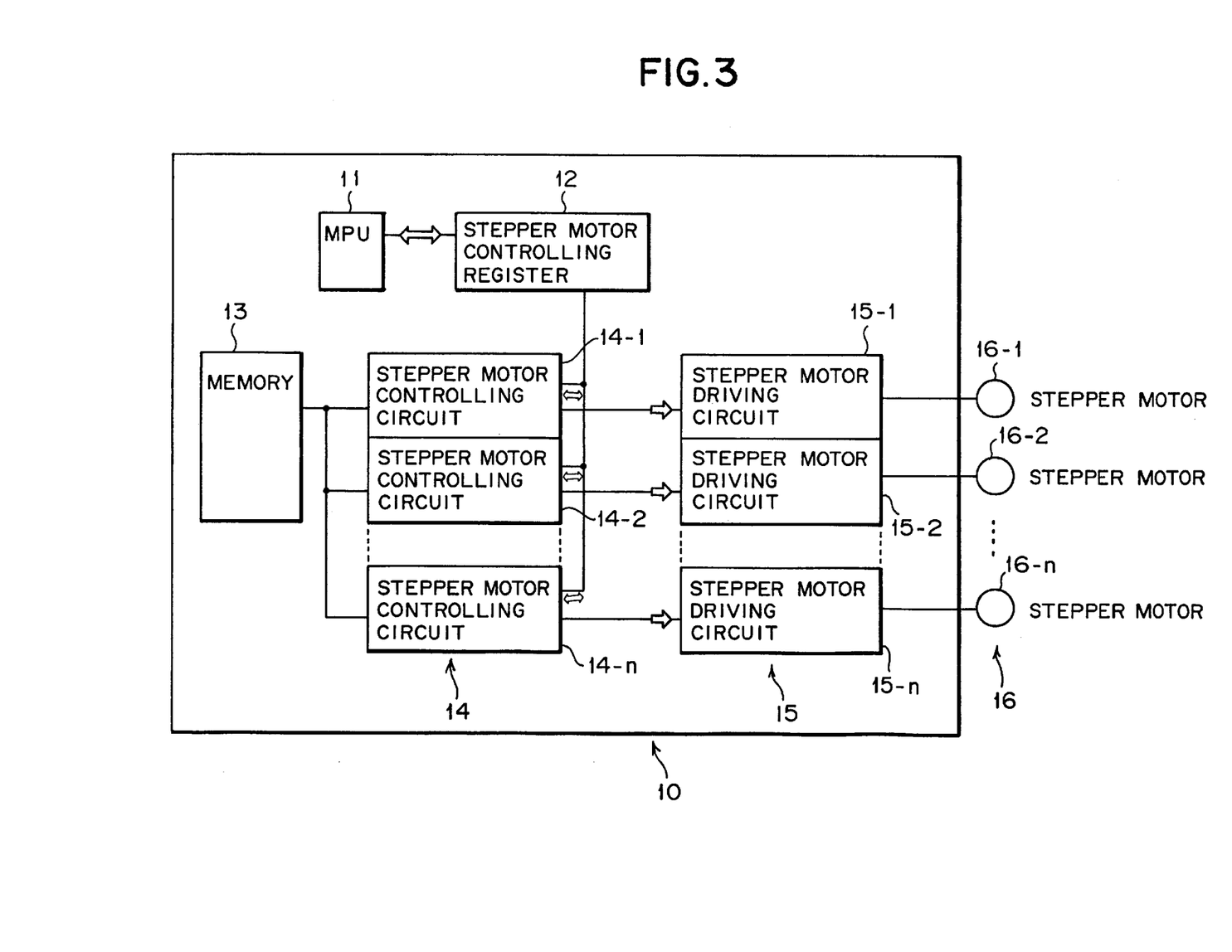
FIG. 3 is a block diagram showing a structure of a stepper motor controlling apparatus according to an embodiment of this invention.

FIG. 3 is a block diagram showing a structure of a stepper motor controlling apparatus according to an embodiment of this invention. A stepper motor controlling apparatus 10 according to the embodiment of this invention is a controlling apparatus controlling operations of a plurality of stepper motors 16-1 through 16-n. The stepper motor controlling apparatus 10 comprises, as shown in FIG. 3, a MPU 11, a stepper motor controlling register 12, a memory (storing unit) 13, stepper motor controlling circuits (controlling circuits) 14-1 through 14-n, and stepper motor driving circuits 15-1 through 15-n.

Operations of the stepper motors 16-1 through 16-n are controlled by the stepper motor controlling apparatus 10 of this embodiment. According to this embodiment, n stepper motors 16-1 through 16-n are controlled and driven. Hereinafter, a plurality of the stepper motors 16-1 through 16-n will be occasionally referred to as stepper motor(s) 16 for the sake of convenience.

The MPU 11 collectively manages and controls this apparatus using the stepper motor controlling register 12.

The stepper motor controlling circuits 141 through 14-n give instructions on acceleration/deceleration or positioning of the stepper motors 16-1 through 16-n to the stepper motor driving circuits 15-1 through 15-n, respectively. The stepper motor controlling circuits 14-1 through 14-n control operations of the stepper motors 16-1 through 16-n via the stepper motor driving circuits 15-1 through 15-n, respectively, which function as the controlling circuits 2 shown in FIG. 1.

Namely, the stepper motor controlling circuits 14-1 through 14-n create stepper motor driving phase signals from sluing data (driving data) stored in the memory 13, and output the stepper motor driving phase signals to the stepper motor driving circuits 15-1 through 15-n, respectively. The sluing data is-configured with timer data for creating a stepper motor driving phase signal for switching a phase signal for the stepper motor 16, and operation information showing an operating state of the stepper motor 16 driven by the timer data (stepper motor driving phase signal).

The stepper motor driving phase signal is a signal for instructing a rotation speed, a direction and an angle of the stepper motor 16, an acceleration/deceleration pattern corresponding to the number of advanced steps of the stepper motor 16, a control timing pulse for positioning, etc., which configured mainly with a pulse and a rotational direction signal.

The operation information shows an operating state of each of the stepper motors 16. For example, the operation information is information showing states during acceleration, during deceleration and during constant-speed rotation and during stop, a state of selection of a motor current, and the like.

According to this embodiment, there are provided n stepper motor controlling circuits 14-1 through 14-n so as to correspond to n stepper motors 16-1 through 16-n. Hereinafter, a plurality of the stepper motor controlling circuits 14-1 through 14-n will be occasionally referred to as the stepper motor controlling circuit(s) 14 for the sake of convenience.

The stepper motor driving circuits 15-1 through 15-n are circuits which determine, distribute and amplify the stepper motor driving phase signals outputted from the stepper motor controlling circuits 14, and excite windings of the stepper motors 16 in a predetermined order. The stepper motor driving circuits 15-1 through 15-n rotate and drive the stepper motors 16-1 through 16-n according to the stepper motor driving phase signals transmitted from the stepper motor controlling circuits 14-1 through 14-n, respectively.

According to this embodiment, there are provided n stepper motor driving circuits 15-1 through 15-n so as to correspond to n stepper motors 16-1 through 16-n. Hereinafter, a plurality of the stepper motor driving circuits 15-1 through 15-n will be occasionally referred to as the stepper motor driving circuit(s) 15 for the sake of convenience.

Inside the memory 13, there are formed a plurality of regions. By storing sluing data in the plural regions, a plurality of the sluing data are stored. The memory 13 functions as the storing unit 1 shown in FIGS. 1 and 2.

Each of the stepper motor controlling circuits 14 designates a predetermined address in these regions in the memory 13, thereby selectively reading specific sluing data from the memory 13. Each of the stepper motor controlling circuits 14 generates a stepper motor driving phase signal using the sluing data.

The stepper motor controlling register 12 is used to temporarily store various information to be used by the MPU 11 and the stepper motor controlling circuit 14 when the stepper motor 16 is controlled, which functions as two types of registers, that is, a controlling register and a status register. In concrete, the stepper motor controlling register 12 stores the number of rotation steps (a designated number of rotation steps) of the stepper motor 16 that will be an opportunity for an interruption processing, a predetermined address of the memory 13 and the like, as the controlling register. As the status register, the stepper motor controlling register 12 also stores operation information on sluing data being now used by each of the stepper motor controlling circuits 14, the number of rotation steps of each of the stepper motors 16 in operation and the like.

Figure 4:
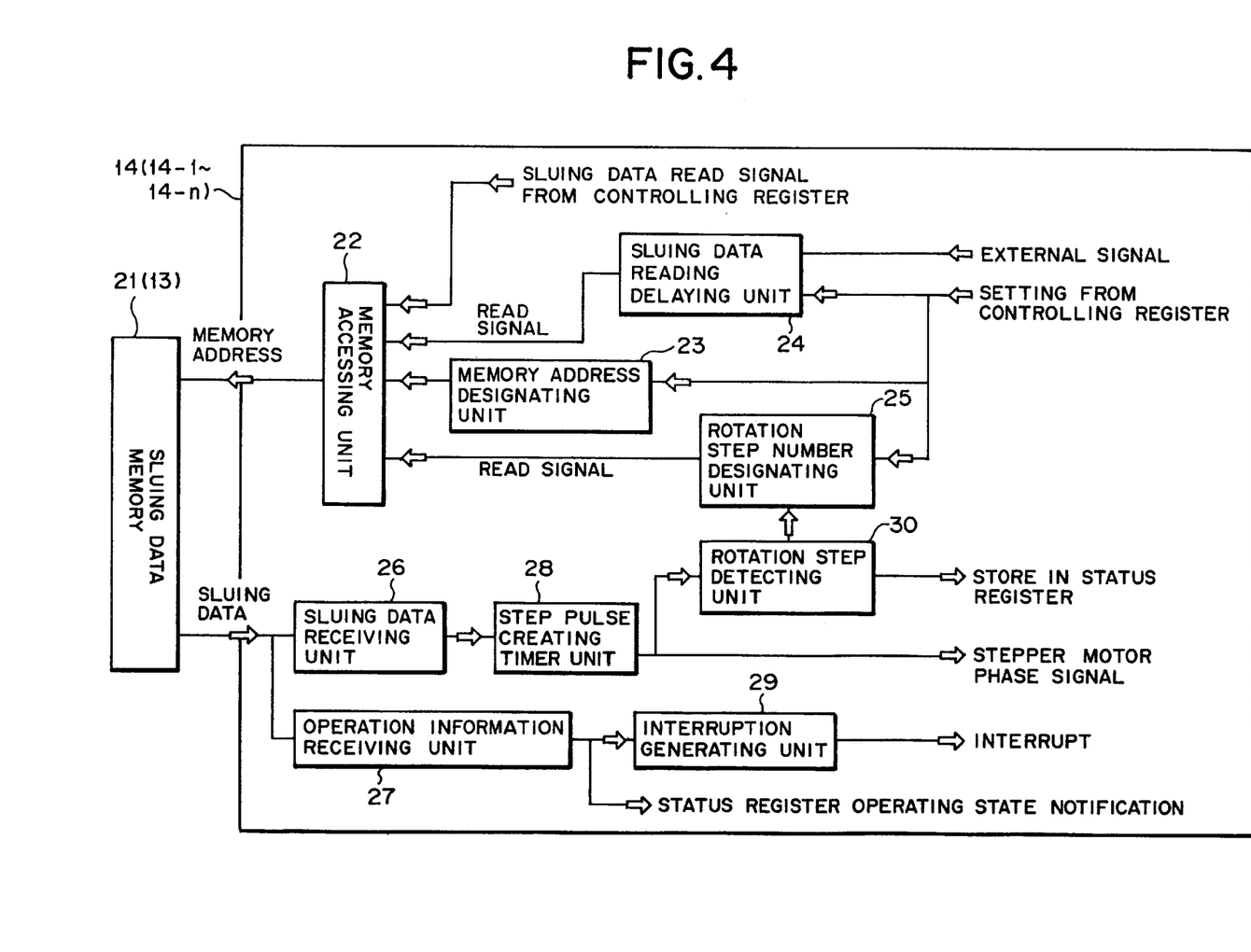
FIG. 4 is a functional block diagram illustrating a detailed structure of a stepper motor controlling circuit in the stepper motor controlling apparatus according to the embodiment of this invention.

FIG. 4 is a functional block diagram for illustrating a detailed structure of the stepper motor controlling circuit 14 in the stepper motor controlling apparatus 10 according to the embodiment of this invention. A sluing data memory 21 shown in FIG. 4 stores the sluing data. Inside the sluing data memory 21, there are formed a plurality of regions designated by predetermined addresses, in each of which the sluing data is stored. In the sluing data memory 21, the same sluing data, that is, duplicate data, is not stored. Incidentally, the memory 13 shown in FIG. 3 functions as the sluing data memory 21.

As shown in FIG. 4, each of the stepper motor controlling circuits 14 comprises a memory accessing unit 22, a memory address designating unit 23, a sluing data reading delaying unit 24, a rotation step number designating unit 25, a sluing data receiving unit 26, an operation information receiving unit 27, a step pulse creating timer unit 28, an interruption generating unit 29 and a rotation step detecting unit 30.

The memory accessing unit 22 refers to a memory address stored in the memory address designating unit 23 when receiving a read signal outputted from each of the controlling register (stepper motor controlling register 12), the sluing data reading delaying unit 24 and the rotation step number designating unit 25, and selectively reads any one of the sluing data stored in a region designated by the memory address from the sluing data memory 21.

Namely, it is possible to selectively read one of arbitrary desired sluing data among a plurality of sluing data stored in the sluing data memory 21 by arbitrarily rewriting a memory address to be stored in the memory accessing unit 22. According to this embodiment, the MPU 11 shown in FIG. 3 functions as the memory accessing unit 22.

The memory address designating unit 23 designates an address designating a region in which desired sluing data is stored in the sluing data memory 21 to be referred by the memory accessing unit 22. In the controlling register (stepper motor controlling register 12), the memory address is stored.

When the sluing data reading delaying unit 24 is inputted an external signal, the sluing data reading delaying unit 24 receives the external signal, after that, outputs a read signal for sluing data (hereinafter referred to as a read signal) to the memory accessing unit 22 upon lapse of a predetermined time. The sluing data reading delaying unit 24 is inputted an instruct signal instructing an operating state of the stepper motor 16 from the outside. When inputted the external signal, the sluing data reading delaying unit 24 outputs a read signal to the memory accessing unit 22 upon lapse of a predetermined time.

As the external signal inputted to the sluing data reading delaying unit 24, there are detect signals from various sensors, an output signal of a timer and the like. A detect signal from a sensor detecting state information relating to an operation of the stepper motor, an output signal from a timer measuring a time with respect to an operation of the stepper motor and the like are inputted as external signals (instruct signals) to the sluing data reading delaying unit 24.

When receiving the read signal, the memory accessing unit 22 reads sluing data corresponding to the external signal (indicate signal) from the sluing data memory 21 according to an address stored in the memory address designating unit 23. A setting as to whether or not an output of the read signal is to be delayed using the sluing data reading delaying unit 24, a setting of a delay time thereupon and the like are stored in the controlling register (stepper motor controlling register 12). The MPU 11 refers to the setting in the controlling register as to whether or not the sluing data reading delaying unit 24 is used. When the setting in the controlling register is that the sluing data reading delaying unit 24 is not used, the MPU 11 inputs the read signal to the memory accessing unit 22 without delay when an external signal is inputted to the sluing data reading delaying unit 24.

The rotation step detecting unit 30 receives a stepper motor driving phase signal sent from the step pulse creating timer unit 28, detect the number of rotation steps of the stepper motor 16 from the stepper motor driving phase signal, and stores the detected number of the rotation steps in the status register (stepper motor controlling register 12).

In the case where it is desired to control an operation of the stepper motor 16 using another sluing data after the stepper motor 16 is rotated by a predetermined number of rotation steps (a designated number of rotation steps), for example, the rotation step number designating unit 25 compares the number of rotation steps of the stepper motor 16 detected by the rotation step detecting unit 30 with a designated number of rotation steps, and outputs a read signal to the memory accessing unit 22 when the detected number of rotation steps becomes equal to the designated number of rotation steps.

A specific address in which desired sluing data is stored in the sluing data memory 21 is set in the memory address designating unit 23 by the time the stepper motor 16 reaches the designated number of rotation steps, whereby a read signal is inputted from the rotation step number designating unit 25 to the memory accessing unit 22 when the stepper motor 16 reaches the designated number of rotation steps, and the memory accessing unit 22 refers to the memory address stored in the memory address designating unit 23 so as to read the sluing data stored in a region designated by the memory address from the sluing data memory 21.

Meanwhile, a predetermined number of rotation steps used in comparing by the rotation step number designating unit 25 is beforehand stored in the controlling register (stepper motor controlling register 12). The sluing data receiving unit 26 takes out only timer data for creating a stepper motor driving phase signal among sluing data read out from the sluing data memory 21, and sends the timer data to the step pulse creating timer unit 28.

The step pulse creating timer unit 28 creates a stepper motor driving phase signal for driving the stepper motor 16 from the timer data taken out by the sluing data receiving unit 26. The step pulse creating timer unit 28 outputs the created stepper motor driving phase signal to the stepper motor driving circuit 15 and to the rotation step detecting unit 30.

The operation information receiving unit 26 takes out only operation information of the sluing data among the sluing data read out from the sluing data memory 21, stores the operation information in the controlling register (stepper motor controlling register 12), and sends the same to the interruption generating unit 29. The interruption generating unit 29 receives the operation information sent from the operation information receiving unit 27, and outputs an interrupt signal when the operation information is switched.

The interruption generating unit 29 can recognize a change of operating state of the stepper motor 16 (for example, a change from during acceleration to constant-speed rotation, a change from during constant-speed rotation to deceleration, or the like) from a change of the operation information sent from the operation information receiving unit 27, and output an interrupt signal with the change of the operating state as a trigger for the next operation setting for the stepper motor 16 when the operating state is changed. It is thereby possible to smoothly perform a speed switching operation of the stepper motor 16 due to a change in the sluing data.

With the above structure, when a read signal to read sluing data is inputted from the controlling register (stepper motor controlling register 12) to the memory accessing unit 22, for example, the memory accessing unit 22 refers to a memory address stored in the memory address designating unit 23. The memory accessing unit 22 reads sluing data stored in a region designated by the memory address from the sluing data memory 21.

The sluing data read out is sent to the sluing data receiving unit 26 and to the operation information receiving unit 27. The sluing data receiving unit 26 takes out only timer data of the sluing data, and sends the timer data taken out to the step pulse creating timer unit 28. The step pulse creating timer unit 28 creates a stepper motor driving phase signal from the timer data, outputs the stepper motor driving phase signal to the stepper motor driving circuit 15, and transmits the same to the rotation step detecting unit 30.

The stepper motor driving circuit 15 receiving the stepper motor driving phase signal controls an operation of the stepper motor 16 according to the stepper motor driving phase signal. The rotation step detecting unit 30 receiving the stepper motor driving phase signal detects the number of rotation steps of the stepper motor 16 from the stepper motor driving phase signal, and stores a value thereof in the status register (stepper motor controlling register 12).

On the other hand, the operation information receiving unit 27 takes out only operation information in the sluing data sent to the operation information receiving unit 27, and sends the operation information taken out to the interruption generating unit 29. The interruption generating unit 29 watches a fluctuation of the operation information sent from the operation information receiving unit 27, and transmits an interrupt signal when the operation information is switched.

The operation information taken out by the operation information receiving unit 27 is also stored in the status register (stepper motor controlling register 12). The MPU 11 and the like can refer to the operation information of the stepper motor 16 stored in the status register. When an external signal from a detecting sensor, a timer or the like is inputted to the sluing data reading delaying unit 24, the sluing data reading delaying unit 24 directly outputs a read signal to the memory accessing unit 22 if the setting stored in the controlling register (stepper motor controlling register 12) as to whether or not outputting of the read signal is to be delayed is that outputting of the read signal is not to be delayed. When the setting is that outputting of the read signal is to be delayed, the sluing data reading delaying unit 24 delays the read signal by a predetermined delay time, then outputs the read signal to the memory accessing unit 22.

In the stepper motor controlling circuit 14, a process similar to the above is performed after the memory accessing unit 22 receives the read signal from the sluing data reading delaying unit 24. According to the stepper motor controlling apparatus 10 of the embodiment of this invention, when a plurality of the stepper motors 16 are controlled, an address of a region of sluing data stored in the sluing data memory 21 is designated using the memory accessing unit 22 and the memory address designating unit 23, whereby desired sluing data is read out even if some of the stepper motors 16 perform similar operations, as stated above. It is therefore unnecessary to store duplicate sluing data in the sluing data memory 21 (memory 13), so that a region in which sluing data is stored in the sluing data memory 21 (memory 13) is saved. This apparatus can be thereby provided with a memory with a small capacity, which is economical.

Figure 5:
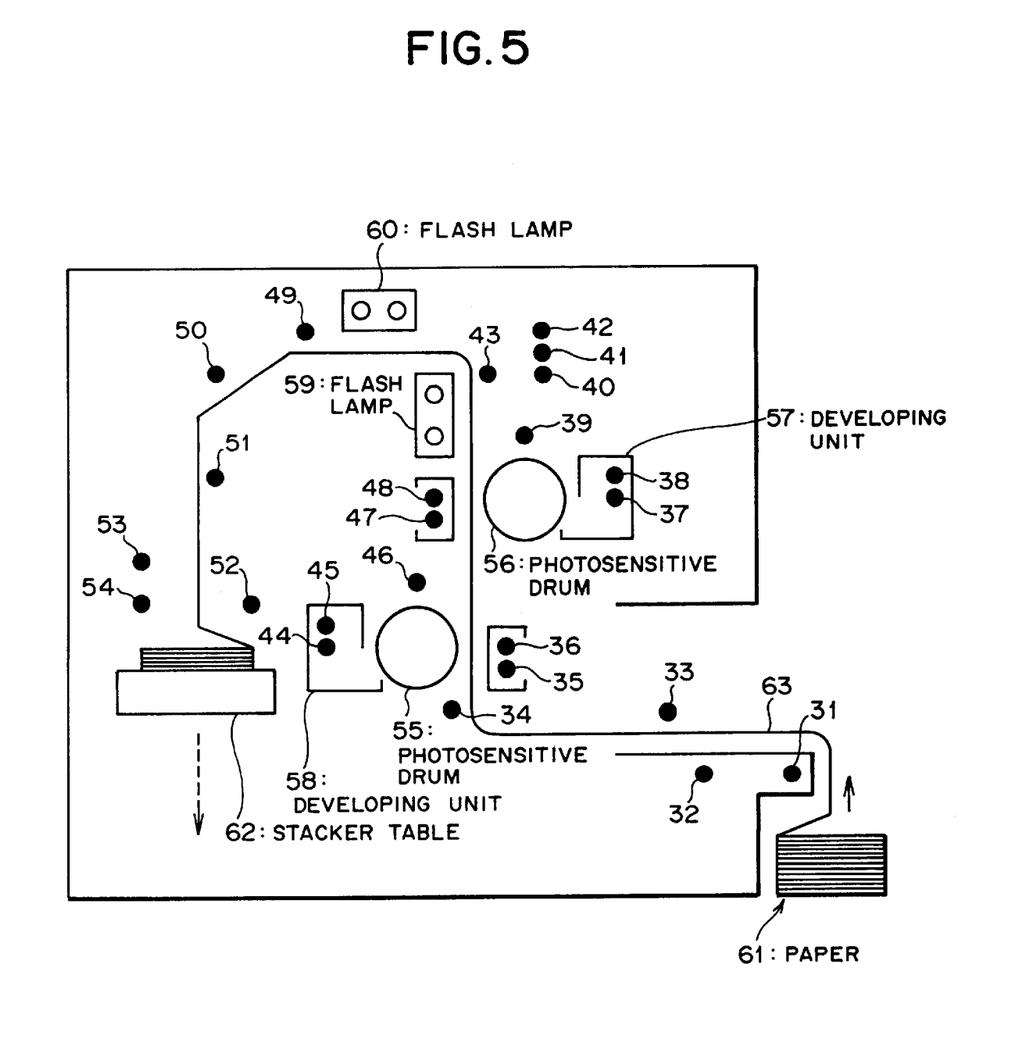
FIG. 5 is a side view schematically showing a structure of a duplex printing apparatus to which the stepper motor controlling apparatus according to the embodiment of this invention is applied.

FIG. 5 is a side view schematically showing a structure of a duplex printing apparatus to which the stepper motor controlling apparatus 10 according to the embodiment of this invention is applied. The duplex printing apparatus shown in FIG. 5 prints on both surfaces of a continuous-form paper 63 in which perforations are formed at predetermined intervals, using electrophotographic system. In the course of conveying the continuous-form paper 63 to a stacker table 62 using a conveying system not shown, the duplex printing apparatus makes prints on the both surfaces of the continuous-form paper 63 using photosensitive drums 55 and 56, and flash lamps 59 and 60.

In concrete, the continuous-form paper 63 folded along perforations is attached to a paper hopper 61. In the course of conveying the continuous-form paper 63 by the conveying system, the photosensitive drum 55 is first developed by a developing unit 58, an unfixed toner image is formed on one surface of the continuous-form paper 63 by the photosensitive drum 55, the photosensitive drum 56 is next developed by a developing unit 57, and an unfixed image is formed on the other surface of the continuous-form paper 63 by the photosensitive drum 56.

The continuous-form paper 63 is conveyed by the conveying system, the unfixed toner image formed on one surface of the continuous-form paper 63 is fixed by the flash lamp 59 to make a print on the surface of the continuous-form paper 63. The unfixed toner image formed on the other surface of the continuous-form paper 63 is then fixed by the flash lamp 60 to make a print on the other surface of the continuous-form paper 63. The continuous-form paper 63 on which the prints were made as above is folded along the perforations, and mounted on a stacker table 62.

In the duplex printing apparatus shown in FIG. 5, stepper motors are used for various purposes. For example, each of a hopper motor 31, a paper-wide motor 32, a back tension motor 33, an autoload motor 34, a transfer wire cleaner motors 35 and 47, transfer guide motors 36 and 48, toner supply motors 37 and 44, toner stir motors 38 and 45, pre-charge wire cleaner motors 39 and 46, a guide roller motor 40, a turn-back roller motor 41, a shield motor 42, an autoload motor 43, scuff roller motors 49 and 50, a swing guide motor 51, pulley motors 52 and 54 and a paper-length motor 53 is configured with a stepper motor.

A number of stepper motors are used in a recent duplex printing apparatus as stated above, sluing data for driving these stepper motors thus reaches a tremendous quantity. Therefore, that a capacity of the memory 13 (sluing data memory 21) storing sluing data for driving a number of the stepper motors can be decreased is very effective in consideration of a structure of the apparatus.

One of sluing data can be arbitrarily read out from the plural sluing data memories 21 (memory 13) in which sluing data is stored by designating a specific address using the memory accessing unit 22 and the memory address designating unit 23, so that it is easy to change a speed or the like of the stepper motor 16.

Arbitrary sluing data can be read out from the sluing data memory 21 (memory 13) by the plural stepper motor controlling circuits 14-1 through 14-n, it is thereby possible to readily change a speed or the like of the stepper motors 16. The operation information showing an operating state of the stepper motor 16 driven by the timer data (stepper motor driving phase signal) is added to the sluing data, so that an operating state of the stepper motor 16 is readily recognized, thus an operation control on the stepper motor 16 is easy.

The operation information receiving unit 27 and the interruption generating unit 29 can monitor operation information, and output an interrupt signal when detecting a change of the operating state of the stepper motor 16. The interrupt signal can be used as a trigger for setting the next operating state of the stepper motor 16. Accordingly, it is possible to smoothly perform a speed changing operation of the stepper motor 16 when the speed of the stepper motor 16 is changed using plural sluing data.

The sluing data reading delaying unit 24 can receive an external signal (instruct signal). When inputted an instruct signal (external signal) indicating an operating state of the stepper motor 16 from the outside, the sluing data reading delaying unit 24 can output a read signal to the memory accessing unit 22, and read sluing data corresponding to the instruct signal from the sluing data memory 21 according to the external signal (instruct signal). Accordingly, it is possible to smoothly perform a speed changing operation of the stepper motor 16.

Further, the sluing data reading delaying unit 24 can receive an external signal. When the setting is that outputting of the read signal is not to be delayed at this time, the sluing data reading delaying unit 24 receives the read signal, and directly outputs the read signal to the memory accessing unit 22. For example, when the sluing data reading delaying unit 24 detects a signal from a sensor, a timer output or the like as an external signal, it is possible to read sluing data without time lag, which improves an accuracy of a start/stop timing.

Namely, a control to start/stop by the controlling register (stepper motor controlling register 12) yields a time lag due to a register setting. On the contrary, since a signal from a sensor, a timer output or the like can be used as a trigger for a start/stop timing, an accuracy of the operation control on the stepper motor 16 can be improved, which leads to an improvement of reliability of the apparatus.

The sluing data reading delaying unit 24 can output, when receiving an external signal, a read signal to the memory accessing unit 22 upon a lapse of a predetermined time, so that a highly accurate control on the stepper motor 16 is possible even at a point without a signal that will become a trigger. In consequence, a part of sensors, timers and the like can be omitted, which is economical.

Sluing data can be read out using the rotation step detecting unit 30 and the rotation step number designating unit 25 when the stepper motor 16 reaches a predetermined number of rotation steps. It is thereby possible to set the number of rotation steps of the stepper motor at a point where a quantity of movement is determined in advance, for example, so as to improve accuracy of the quantity of movement.

Using the sluing data reading delaying unit 24, the rotation step number designating unit 25 and the rotation step detecting unit 30, it is possible to designate the number of rotation steps of the stepper motor 16 even during an operation of the stepper motor 16 from when an external signal such as a detect signal of a sensor or the like is received, which leads to an improvement of accuracy of a stopping position or the like.

The rotation step detecting unit 30 can detect the number of rotation steps of the stepper motor 16, and the MPU 11 or the like that is the upper apparatus can compare the detected number of rotation steps with the number of rotation steps that should be obtained at that time when an external signal such as a detect signal of a sensor or the like is received, thereby detecting maladjustment of the stepper motor 16, or detecting a compensation quantity of the number of rotation steps of the stepper motor 16 from a difference between the numbers of the rotation steps, which leads to an improvement of the reliability.

As having been fully described the embodiment of this invention, the present invention may be modified in various ways without departing from a scope of the invention.

What is claimed is:

1. A stepper motor controlling apparatus comprising:

a plurality of controlling circuits for controlling operations of a plurality of stepper motors, respectively; and a storing unit that stores common driving data, which includes a number of items and which is shared by said plural controlling circuits, for generating a stepper motor driving phase signal in each of said controlling circuits, said plural items of common driving data being void of any overlapping items of driving data, each said controlling circuit selectively reading one of said items included in said common driving data from said storing unit for use.

2. The stepper motor controlling apparatus according to claim 1, wherein said common driving data is stored in a region designated by a predetermined address in said storing unit, and each said controlling circuit designates said predetermined address to selectively read specific common driving data from said storing unit.

3. The stepper motor controlling apparatus according to claim 1, wherein operation information representing an operating state of said stepper motor driven by said common driving data is added to said common driving data in said storing unit.

4. The stepper motor controlling apparatus according to claim 3, wherein each said controlling circuit outputs an interrupt signal when detecting a change of the operating state of said stepper motor on the basis of said operation information added to said common driving data during reading the common driving data.

5. The stepper motor controlling apparatus according to claim 1, wherein each said controlling circuit reads common driving data according to an instruct signal from said storing unit when inputted said instruct signal instructing an operating state of said stepper motor from an outside of said controlling circuit, and controls an operation of said stepper motor using said read common driving data.

6. The stepper motor controlling apparatus according to claim 5, wherein said instruct signal is a detect signal from a sensor that detects state information relating to an operation of said stepper motor.

7. The stepper motor controlling apparatus according to claim 5, wherein said instruct signal is an output signal from a timer that measures a time relating to an operation of said stepper motor.

8. The stepper motor controlling apparatus according to claim 5, wherein each said controlling circuit reads common driving data according to said instruct signal from said storing unit upon lapse of a predetermined time after said instruct signal has been inputted.

9. The stepper motor controlling apparatus according to claim 6, wherein each said controlling circuit reads common driving data according to said instruct signal from said storing unit upon lapse of a predetermined time after said instruct signal has been inputted.

10. The stepper motor controlling apparatus according to claim 7, wherein each said controlling circuit reads common driving data according to said instruct signal from said storing unit upon lapse of a predetermined time after said instruct signal has been inputted.

11. The stepper motor controlling apparatus according to claim 1, wherein each said controlling circuit detects the number of rotation steps of said stepper motor after said stepper motor is started, reads predetermined common driving data from said storing unit when the detected number of rotation steps coincides with a preset designated value, and controls an operation of said stepper motor using said read predetermined common driving data.

12. The stepper motor controlling apparatus according to claim 1, wherein each said controlling circuit detects the number of rotation steps of said stepper motor after said stepper motor is started, and notifies of the detected number of rotation steps an upper apparatus.

* * * * *